US010921767B2

(12) United States Patent
Kobayashi et al.

(10) Patent No.: US 10,921,767 B2
(45) Date of Patent: Feb. 16, 2021

(54) ENCODER SYSTEM

(71) Applicants: Kabushiki Kaisha Toshiba, Tokyo (JP); Toshiba Electronic Devices & Storage Corporation, Tokyo (JP)

(72) Inventors: Akihiro Kobayashi, Kanagawa (JP); Makoto Kanda, Kanagawa (JP); Shigeru Itoh, Kanagawa (JP); Hiroshi Nishikawa, Kanagawa (JP); Wataru Furuichi, Ibaraki (JP); Kiyoshige Taga, Kanagawa (JP); Kazuma Takeda, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 3 days.

(21) Appl. No.: 16/537,904

(22) Filed: Aug. 12, 2019

(65) Prior Publication Data

US 2020/0125049 A1 Apr. 23, 2020

(30) Foreign Application Priority Data

Oct. 23, 2018 (JP) .............................. JP2018-199042

(51) Int. Cl.
*G05B 19/29* (2006.01)
*G05B 19/042* (2006.01)
*G01D 5/245* (2006.01)
*G01D 5/244* (2006.01)

(52) U.S. Cl.
CPC .......... *G05B 19/042* (2013.01); *G01D 5/2454* (2013.01); *G01D 5/24457* (2013.01); *G05B 2219/25252* (2013.01); *G05B 2219/25257* (2013.01)

(58) Field of Classification Search
CPC ...................... G05B 19/042; G01D 5/24457
USPC ........................................................ 318/602
See application file for complete search history.

(56) References Cited

U.S. PATENT DOCUMENTS

| 4,274,613 | A | * | 6/1981 | Taub | .................... B65D 5/5206 248/150 |
| 4,831,510 | A | * | 5/1989 | Dummermuth | .... G01D 5/24404 318/603 |
| 5,525,885 | A | | 6/1996 | Sato | |
| 7,312,437 | B2 | | 12/2007 | Hane | |

(Continued)

FOREIGN PATENT DOCUMENTS

| JP | H04-25716 A | 1/1992 |
| JP | H07-239716 A | 9/1995 |

(Continued)

*Primary Examiner* — Erick D Glass
(74) *Attorney, Agent, or Firm* — White & Case LLP (57) ABSTRACT

According to an embodiment, an encoder system includes an encoder and an interface. The encoder detects the position and speed of a motor, and generates A-, B- and Z-phase signals. The interface includes an AB waveform recognition circuitry to recognize a waveform of an AB phase, a Z waveform recognition circuitry to recognize a period of an enable state of a Z phase, a starting point storage device to store a value of the AB phase when the Z phase changes and stores an AB-phase change pattern, a starting point recognition circuitry to generate an interrupt signal, and a rotation angle counter to start a new count of the rotation angle of the motor.

17 Claims, 11 Drawing Sheets

(56) References Cited

U.S. PATENT DOCUMENTS

2004/0008002 A1* 1/2004 Kamio ................ H02P 6/12
318/701

FOREIGN PATENT DOCUMENTS

| JP | 2003-83771 A | 3/2003 |
| WO | 2017-126093 A1 | 7/2017 |

* cited by examiner

ENCODER SYSTEM

CROSS REFERENCE TO RELATED APPLICATION

This application is based upon and claims the benefit of priority from the prior Japanese Patent Application No. 2018-199042, filed on Oct. 23, 2018, the entire contents of which are incorporated herein by reference.

FIELD

Embodiments described herein relate to an encoder system.

BACKGROUND

In controlling a motor, accurate measurement of a rotation angle and the number of rotations of the motor is very important. An encoder is provided around the motor (on the shaft, for example) to detect the position and speed of the motor. The encoder is also referred to as a "rotary encoder." The encoder converts detected analog information (position information and speed information) on the motor into digital information, and outputs digital A-, B- and Z-phase signals.

In a case where the rotation angle and the number of rotations of the motor are counted at a starting point indicated by a rise or fall in the Z-phase signal from the encoder, there is a problem that noise in transmission paths, the stop of a rotor around the starting position, and the like makes it difficult to accurately measure the rotation angle and the number of rotations of the motor.

Against this background, the rotation angle and the number of rotations of the motor are required to be always accurately measured without being affected by the surrounding environment.

DETAILED DESCRIPTION

According to an embodiment, an encoder system includes an encoder and an interface. The encoder detects the position and speed of a motor, and generates A-, B- and Z-phase signals. The interface includes an AB waveform recognition circuitry to recognize a waveform of an AB phase from the A- and B-phase signals, a Z waveform recognition circuitry to recognize a period of an enable state of a Z phase from the Z-phase signal, a starting point storage device to store a value of the AB phase when the Z phase changes from a disable state to the enable state and stores an AB-phase change pattern, a starting point recognition circuitry to generate and output an interrupt signal which changes from the disable state to the enable state after the AB-phase change pattern goes through following the changed in the Z phase from the disable state to the enable state, and a rotation angle counter to reset a count of a rotation angle of the motor, and start a new count of the rotation angle of the motor at a timing of the interrupt signal.

Referring to the drawings, descriptions will be hereinbelow provided for other embodiments. The same reference signs denote the same or similar portions throughout the drawings.

Figure 1:
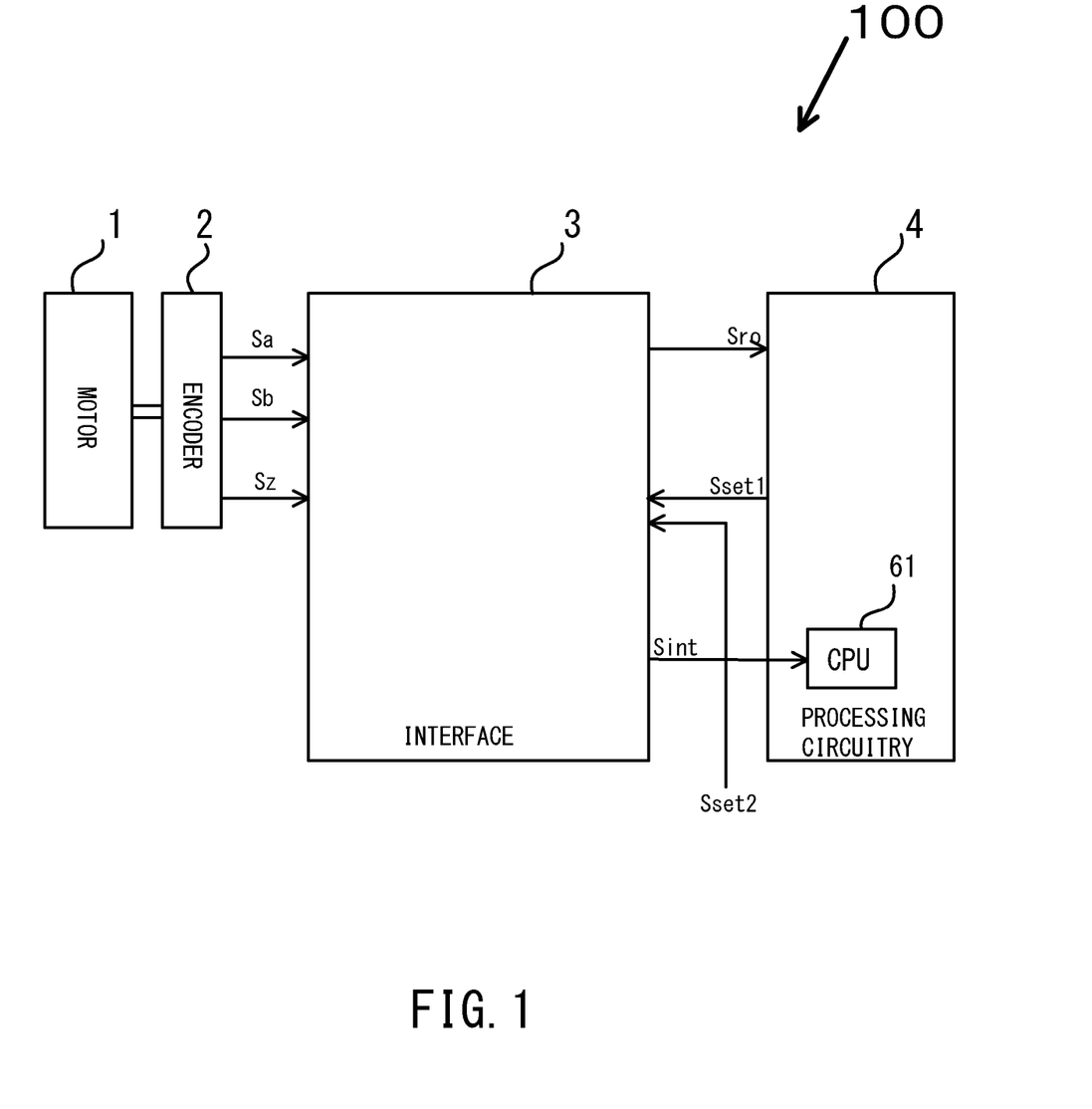
FIG. 1 is a diagram illustrating an encoder system according to a embodiment.

Referring to the drawings, descriptions will be provided for an encoder system according to a first embodiment. FIG. 1 is a diagram illustrating the encoder system.

In the first embodiment, an interface is provided between an encoder and a processing circuitry. The interface generates an AB-phase signal from A- and B-phase signals, and recognizes information on the AB-phase signal at a starting point indicated by a rise in a Z-phase signal. The interface resets information in a rotation angle counter at a starting point indicated by a beforehand stored AB-phase change pattern, and the rotation angle counter starts a new count. The number of rotations of a motor is incremented at the starting point indicated by the AB-phase change pattern.

As illustrated in FIG. 1, an encoder system 100 includes a motor 1, an encoder 2, an interface 3, and a processing circuitry 4. The motor 1 is applied to various fields of motor-equipped home appliances, industrial apparatuses and the like. A microcontroller, a micro processing unit (MPU) or the like is used as the processing circuitry 4.

The encoder 2 is also referred to as a "rotary encoder," and is a sensor to detect the position and speed of the motor 1. The encoder 2 is provided between the motor 1 and the interface 3. The encoder 2 converts detected analog information (position information and speed information) on the motor into digital information, and outputs digital A-, B- and Z-phase signals Sa, Sb, Sz representing the digital information to the interface 3.

The interface 3 is provided between the encoder 2 and the processing circuitry 4. The interface 3 generates a readout signal Sro and an interrupt signal Sint based on the A-, B- and Z-phase signals Sa, Sb, Sz, and outputs the readout signal Sro and the interrupt signal Sint to the processing circuitry 4. The readout signal Sro represents rotation angle information on the motor 1 which is obtained by measuring the rotation angle of the motor 1. The interrupt signal Sint is a signal to be used to increment the number of rotations of the motor 1. The interface 3 receives a set signal Sset1 from the processing circuitry 4, and receives a set signal. Sset2 from the outside of the encoder system 100 (a user using the encoder system 100, for example). The set signals Sset1, Sset2 each include information on the AB-phase change pattern.

The processing circuitry 4 includes a central processing unit (CPU) 61. The processing circuitry 4 receives and stores the readout signal Sro representing the rotation angle information of the motor 1 which is obtained by measuring the rotation angle of the motor 1 and is outputted from the interface 3. The CPU 61 receives the interrupt signal Sint, and increments the number of rotations of the motor 1 at the starting point indicated by the rise in the interrupt signal Sint.

Figure 2:
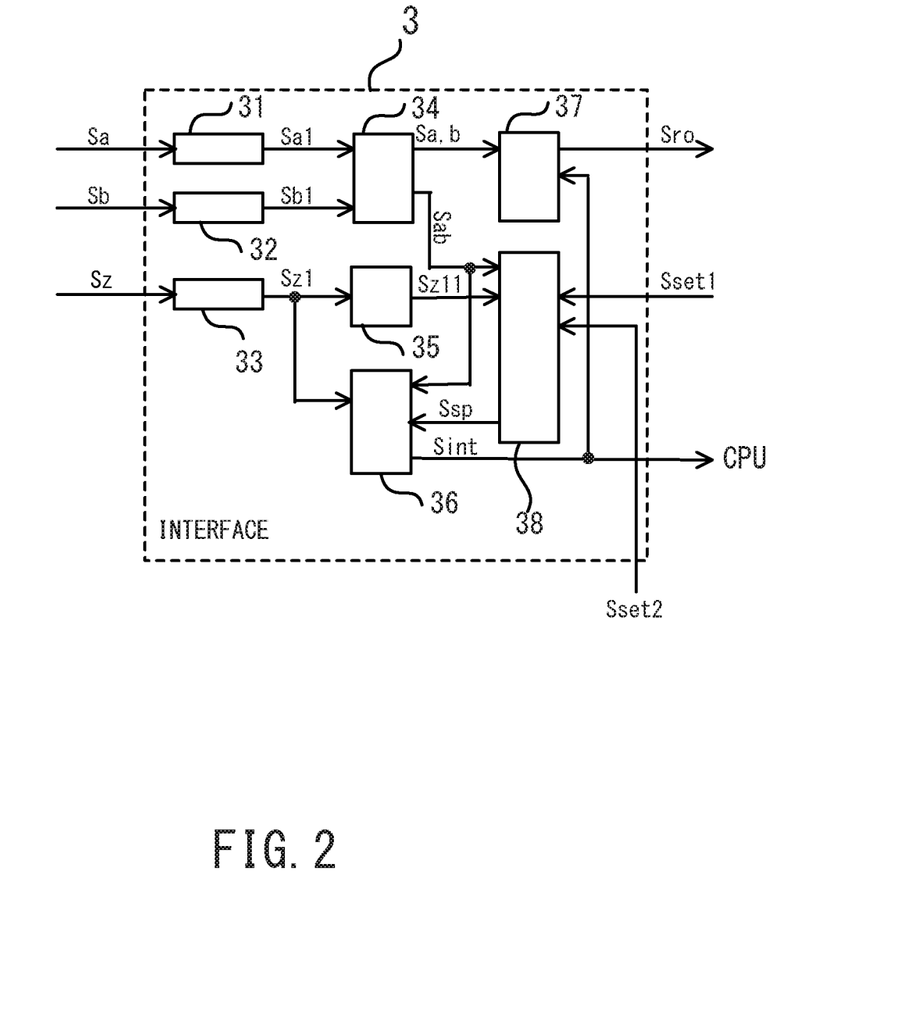
FIG. 2 is a diagram illustrating an internal configuration of an interface according to the first embodiment.

As illustrated in FIG. 2, the interface 3 includes a digital filter 31, a digital filter 32, a digital filter 33, an AB waveform recognition circuitry 34, a. Z waveform recognition circuitry 35, a starting point recognition circuitry 36, a rotation angle counter 37, and a starting point storage device 38.

The digital filter 31 receives the A-phase signal Sa outputted from the encoder 2. The digital filter 31 removes noise generated in the encoder 2, signal lines and the like from the A-phase signal Sa, and outputs a noise-removed A-phase signal Sa1 to the AB waveform recognition circuitry 34.

The digital filter 32 receives the B-phase signal Sb outputted from the encoder 2. The digital filter 32 removes the noise generated in the encoder 2, the signal lines and the like from the B-phase signal Sb, and outputs a noise-removed B-phase signal Sb1 to the AB waveform recognition circuitry 34.

The digital filter 33 receives the Z-phase signal Sz outputted from the encoder 2. The digital filter 33 removes the noise generated in the encoder 2, the signal lines and the like from the Z-phase signal Sz, and outputs a noise-removed Z-phase signal Sz1 to the Z waveform recognition circuitry 35.

The AB waveform recognition circuitry 34 receives the A- and B-phase signals Sa1, Sb1, and recognizes a change in the AB phase. The AB waveform recognition circuitry 34 outputs a rotation direction and a count pulse to the rotation angle counter 37, and outputs an AB-phase signal Sab and the rotation direction to the starting point storage device 38.

The Z waveform recognition circuitry 35 receives the Z-phase signal Sz1, and outputs a Z-phase signal Sz11 to the starting point storage device 38.

The starting point storage device 38 receives the AB- and Z-phase signals Sab, Sz11, and stores the state in which the AB phase is when the Z phase changes. The starting point storage device 38 receives the set signals Sset1, Sset2. The starting point storage device 38 outputs a set point signal. Ssp representing a set point as the starting point to the starting point recognition circuitry 36. A buffer memory, a nonvolatile semiconductor memory or the like is used as the starting point storage device 38.

The starting point recognition circuitry 36 receives the Z- and AB-phase signals Sz1, Sab and the set point signal Ssp, and recognizes the recurrence of the starting point of one cycle each time the AB-phase signal Sab and the set point signal Ssp coincide with each other. The starting point recognition circuitry 36 outputs the interrupt signal. Sint presenting the starting point to the rotation angle counter 37 and the CPU 61.

The rotation angle counter 37 receives the rotation direction, the count pulse, and the interrupt signal. Sint representing the starting point. The rotation angle counter 37 resets the count of the rotation angle when the interrupt signal Sint rises, and starts a new count of the rotation angle. The rotation angle counter 37 outputs the readout signal Sro representing the rotation angle information obtained by measuring the rotation angle of the motor 1 to the processing circuitry 4.

Figure 3:
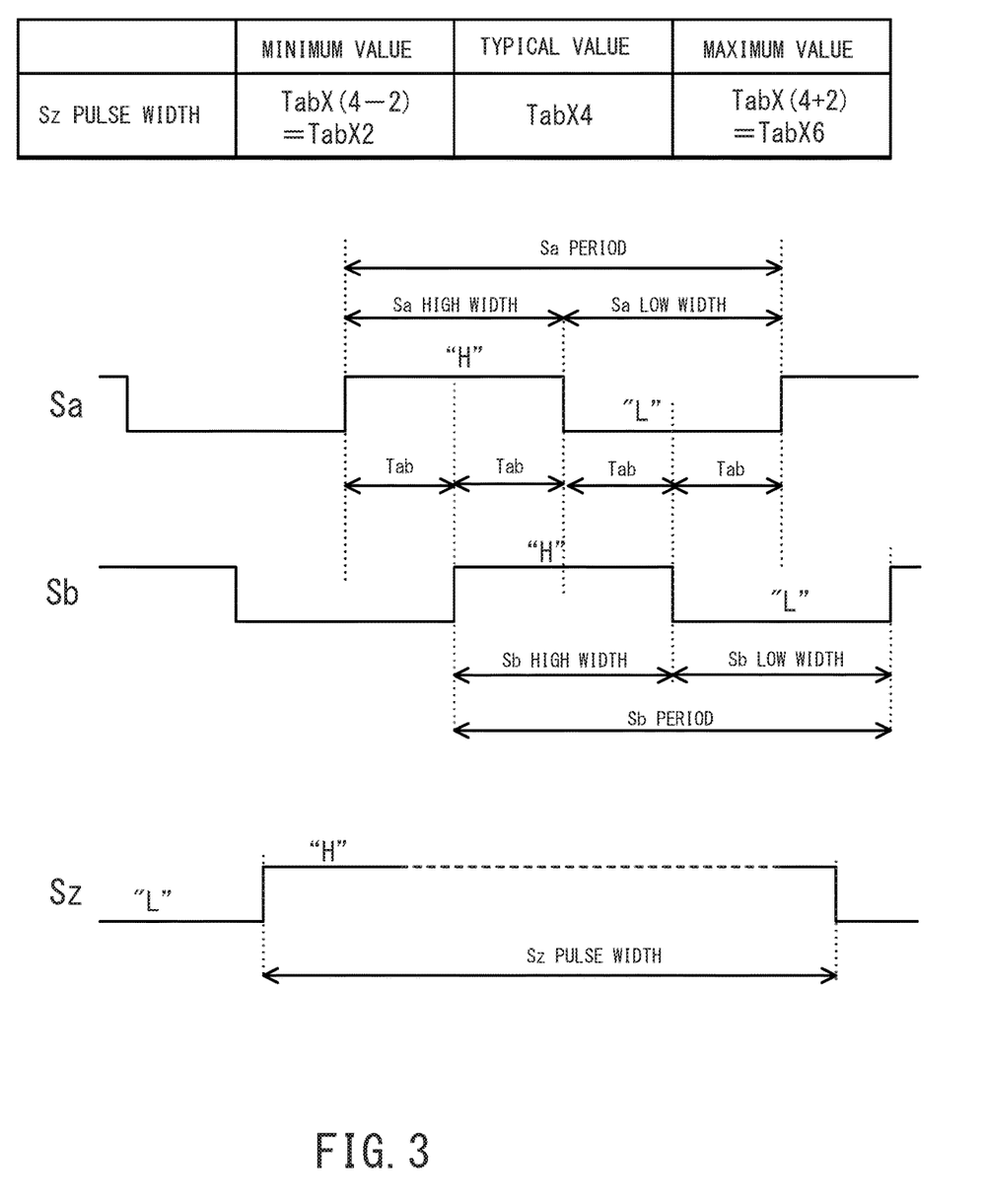
FIG. 3 is a diagram for explaining signals to be inputted into the interface in the first embodiment.

Next, referring to the FIG. 3, descriptions will be provided for the information on the A-, B- and Z-phase signals Sa, Sb, Sz to be inputted into the interface 3. In the first embodiment, each cycle of the system clock is denoted by reference sign Fcyc, a phase difference between the A-phase signal Sa and the B-phase signal Sb is denoted by reference sign Tab, and an enable state (high level) of the Z-phase signal Sz is represented by a Sz pulse width. Incidentally, the enable state of the Z-phase signal Sz may be at a low level instead.

As illustrated in FIG. 3, the typical value (typ.) of the Sz pulse width is set at Tab×4. The minimum value of the Sz pulse width is set at Tab×2. The maximum value of the Sz pulse width is set at Tab×6. Incidentally, none of the typical, minimum and maximum values of the Sz pulse width are not necessarily limited to these. The typical, minimum and maximum values of the Sz pulse width may be changed depending on the necessity.

Figure 4:
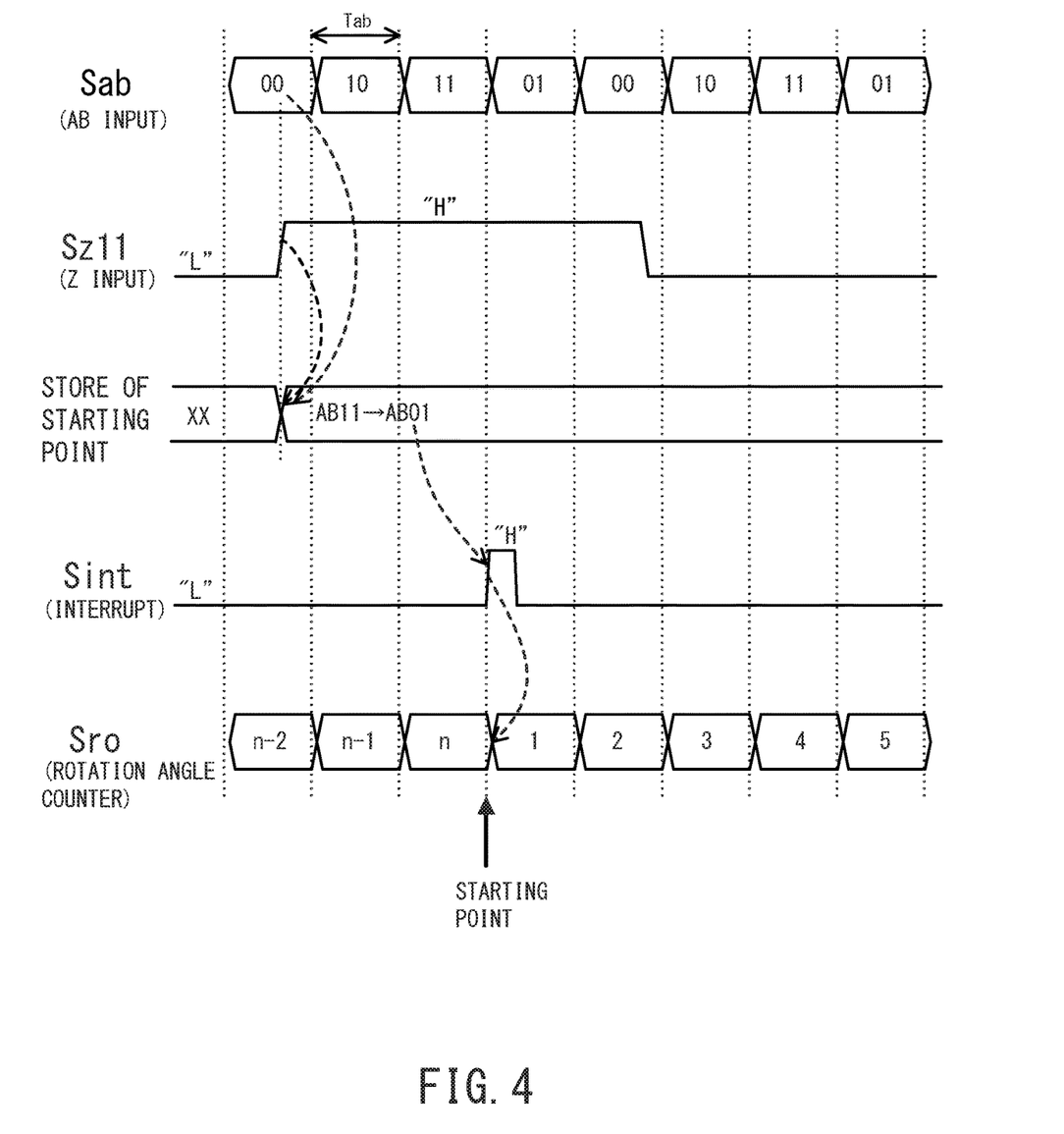
FIG. 4 is a timing chart illustrating how the interface according to the first embodiment works.

Next, referring to FIG. 4, descriptions will be provided for how the interface works. FIG. 4 is a timing chart illustrating how the interface works. In the first embodiment, while at the high level, the Z phase represents the enable state. The Z phase is clockwise. The starting point is set within a period in which the Z phase is in the enable state. In a case where the pulse width of the Z-phase signal is equal to Tab×4 as well as A=0 and B=0 when the Z phase rises, for example, the starting point is set as a point of change from AB10 to AB11.

As illustrated in FIG. 4, while passing the Z phase for the first time, based on the state in which the AB phase is when the Z phase rises, the AB-phase change pattern within the period of the high level of the Z phase is defined as the starting point of the interruption. The starting point storage device 38 stores pattern information on the AB-phase change pattern thus defined as the starting point. In the first embodiment, the AB-phase change pattern is set at Tab×2, for example.

From the next time, a change from AB11 to AB01 is checked from the AB-phase signal Sab and the storing of the starting point. Once the AB-phase signal Sab and the starting point coincide with each other, the interrupt signal Sint changes from the low level representing the disable state to the high level representing the enable state. The rotation angle counter 37 resets the count value at the starting point indicated by the rise in the interrupt signal Sint to the high level, and starts a new count of the rotation angle.

In FIG. 4, the interval from the rise in the Z phase to the starting point is set at Tab×2. The interval, however, may be within a range of Tab×2 to (Tab×2)+α (spare time).

In the first embodiment, while at the low level, the interrupt signal Sint is in the disable state, and while at the high level, the interrupt signal Sint is in the enable state. However, while at the high level, the interrupt signal Sint may be in the disable state, and while at the low level, the interrupt signal Sint may be in the enable state. Furthermore, the interrupt signal Sint may be a pulse signal.

Starting point information on the rise in the interrupt signal Sint to the high level is sent to the CPU 61. The CPU 61 receives the starting point information, and increments the number of rotations of the motor at the starting point indicated by the rise in the interrupt signal. Sint to the high level.

It should be noted that the starting point information does not physically changes during the same encoding. For this reason, the set signal Sset1 from the processing circuitry 4 or the set signal. Sset2 from the outside may be stored in advance in the starting point storage device 38 as the interval from the storing of the starting point to the start of the interruption (the AB-phase change pattern).

In the first embodiment, the timing at which the rotation angle counter 37 resets the count value is synchronized with the timing at which the number of rotations of the motor is incremented. The starting point is synchronized with the point of change in the AB phase. For this reason, in a case where the rotor stops around the starting point, even if slight vibration occurs, the AB phase changes and the rotation direction information can be obtained. The number of rotations of the motor will never be miscounted. Since the starting point coincides with the point of change of the rotation angle counter 37, the rotation angle counter 37 will commit no miscount. Apart from the case where the rotor stops around the starting point, for example, even in a case where noise occurs in the transmission paths and signal lines, the rotation angle and the number of rotations of the motor can be accurately measured.

Figure 5:
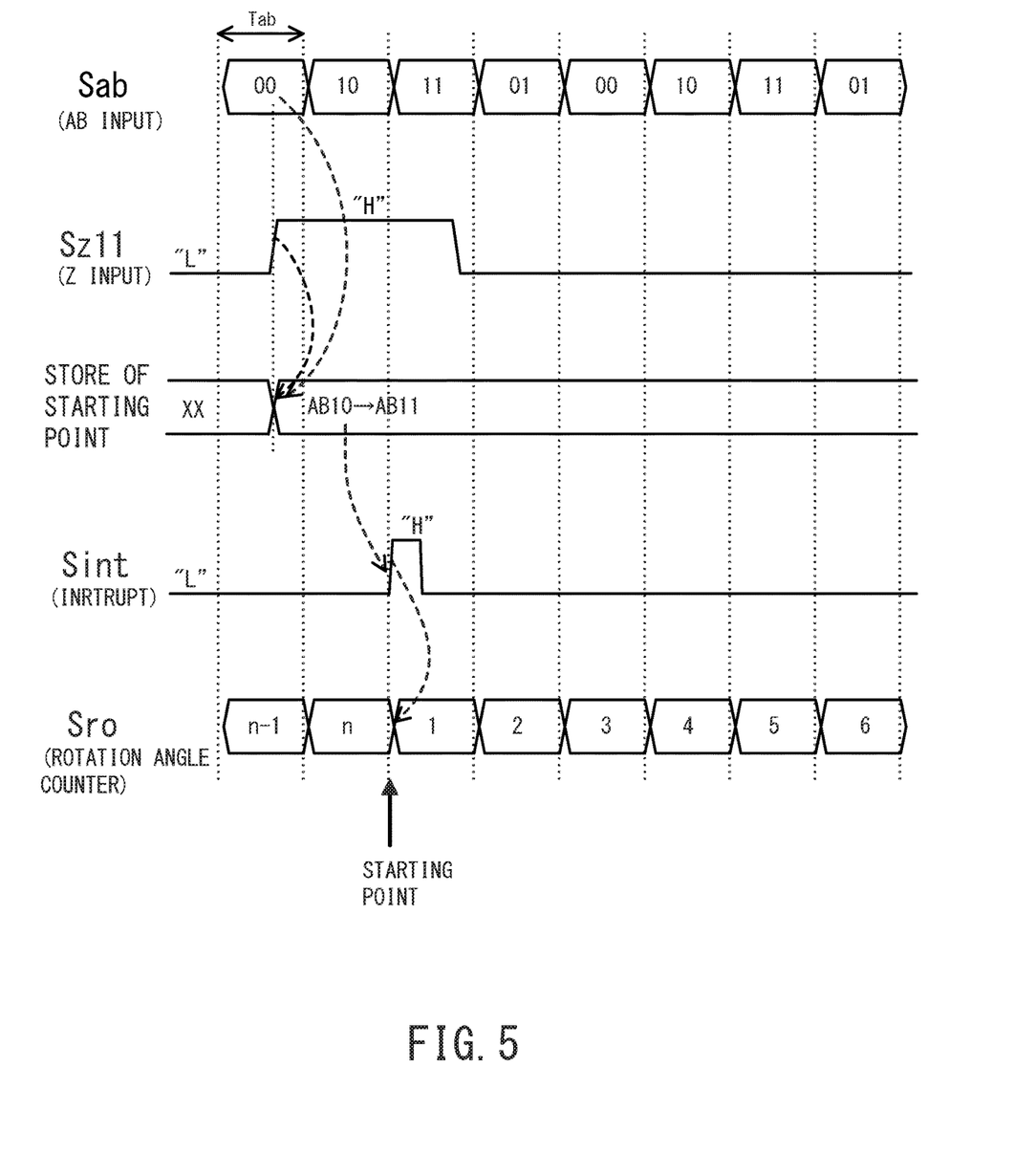
FIG. 5 is a timing chart illustrating how an interface according to a first modification works.

Next, referring to FIG. 5, descriptions will be provided for a first modification. FIG. 5 is a timing chart illustrating how an interface according to the first modification works. In the first modification, while at the high level, the Z phase represents the enable state. The Z phase is clockwise. In a case where the pulse width of the Z-phase signal is equal to Tab×2 as well as A=0 and B=0 when the Z phase rises, the starting point is recognized as the point of change from AB10 to AB11. The interval from the storing of the starting point to the start of the interruption (the AB-phase change pattern) is set at Tab+α, for example.

As illustrated in FIG. 5, the value of the AB-phase signal Sab when the Z phase rises to the high level (in this case, information representing "00") is stored as the starting point. The change from AB10 to AB11 is checked from the AB-phase signal Sab and the storing of the starting point. Once the AB-phase signal Sab and the starting point coincide with each other, the interrupt signal Sint changes from the low level to the high level. The rotation angle counter 37 resets the count value at the starting point indicated by the rise in the interrupt signal Sint to the high level, and starts a new count of the rotation angle.

Starting point information on the rise in the interrupt signal Sint to the high level is sent to the CPU 61. The CPU 61 receives the starting point information, and increments the number of rotations of the motor at the starting point indicated by the rise in the interrupt signal Sint to the high level.

In the first modification, the timing at which the rotation angle counter 37 resets the count value is synchronized with the timing at which the number of rotations of the motor is incremented, like in the first embodiment.

For this reason, in the case where the rotor stops around the starting point, even if slight vibration occurs, the AB phase changes and the rotation direction information can be obtained. The number of rotations of the motor will never be miscounted. Since the starting point coincides with the point of change of the rotation angle counter 37, the rotation angle counter 37 will commit no miscount.

Figure 6:
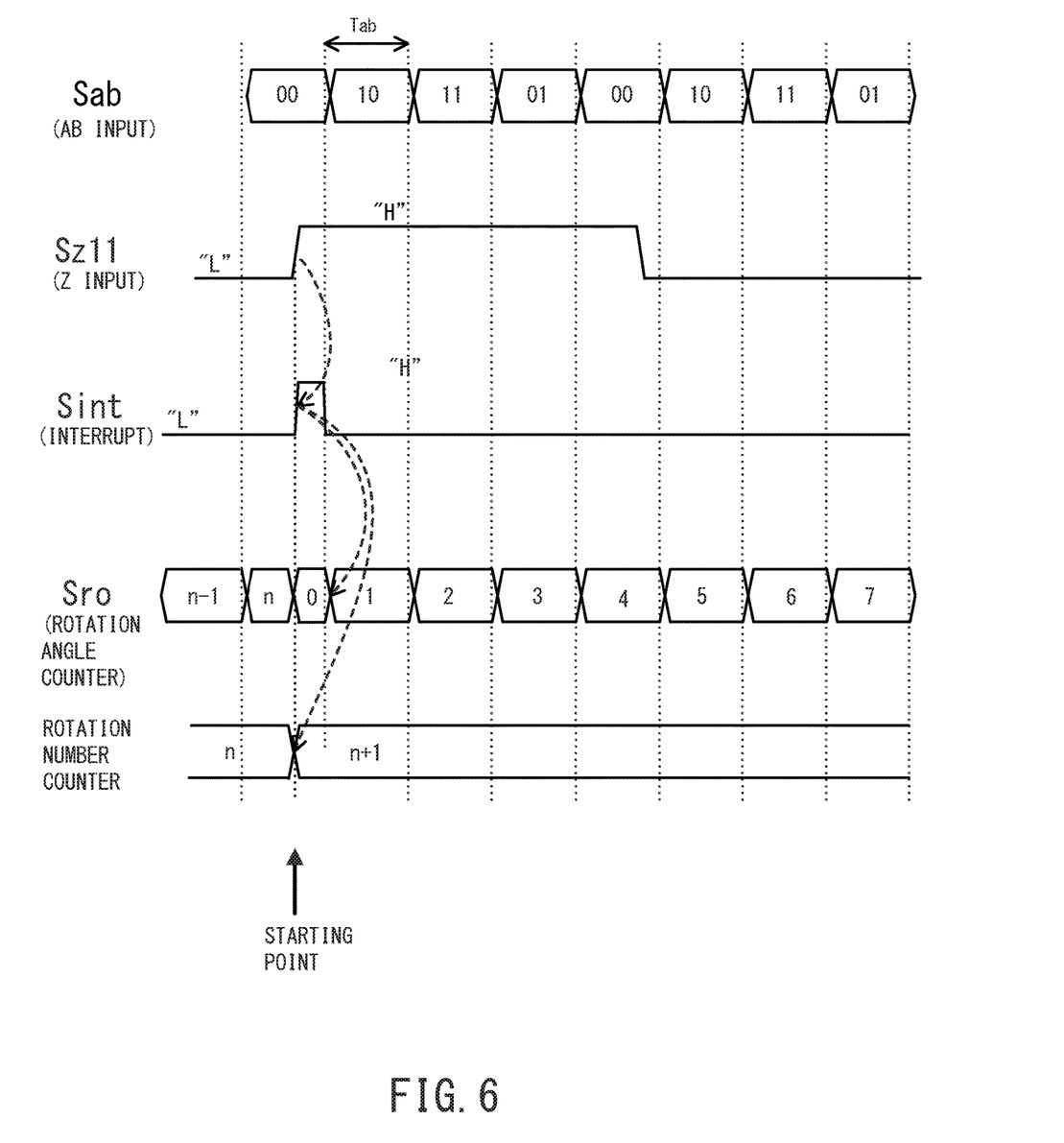
FIG. 6 is a timing chart illustrating how an interface according to a first comparative example works.

Next, referring to FIG. 6, descriptions will be provided for a first comparative example. FIG. 6 is a timing chart illustrating how an interface according to a first comparative example works.

As illustrated in FIG. 6, the interrupt signal Sint changes from the low level to the high level when the Z phase rises to the high level. The number of rotations of the motor is incremented at the starting point indicated by a change of the signal level of the interrupt signal Sint.

The rotating angle counter resets the value of the rotation angle of the motor at the starting point indicated by the change in the signal level of the interrupt signal. Sint. When the value of the AB-phase signal Sab changes from "00" to "01," the rotating angle counter starts a new count of the rotation angle.

The timing at which the rotation angle counter resets the count value is not synchronized with the timing at which the number of rotations of the motor is incremented. For this reason, noise in the transmission paths, the stop of the rotor around the starting point, and the like make it difficult to measure the rotation angle and the number of rotations of the motor accurately.

As discussed above, in the encoder system 100 according to the first embodiment, the interface 3 is provided between the encoder 2 and the processing circuitry 4. The interface 3 includes the digital filter 31, the digital filter 32, the digital filter 33, the AB waveform recognition circuitry 34, the Z waveform recognition circuitry 35, the starting point recognition circuitry 36, the rotation angle counter 37, and the starting point storage device 38. The interface 3 generates the AB-phase signal Sab from the A- and B-phase signals Sa, Sb, and recognizes the information on the AB-phase signal Sab at the timing when the Z-phase signal Sz rises. The interface 3 resets the information in the rotation angle counter 37 at the starting point indicated by the beforehand stored AB-phase change pattern, and the rotation angle counter starts the new count. The number of rotations of the motor is incremented at the starting point indicated by the AB-phase change pattern. The timing at which the rotation angle counter 37 resets the count value is synchronized with the timing at which the number of rotations of the motor is incremented.

For these reasons, even in cases such as the noise in the transmission paths and the stop of the rotor around the starting point, the rotation angle and the number of rotations of the motor can be measured accurately.

Figure 7:
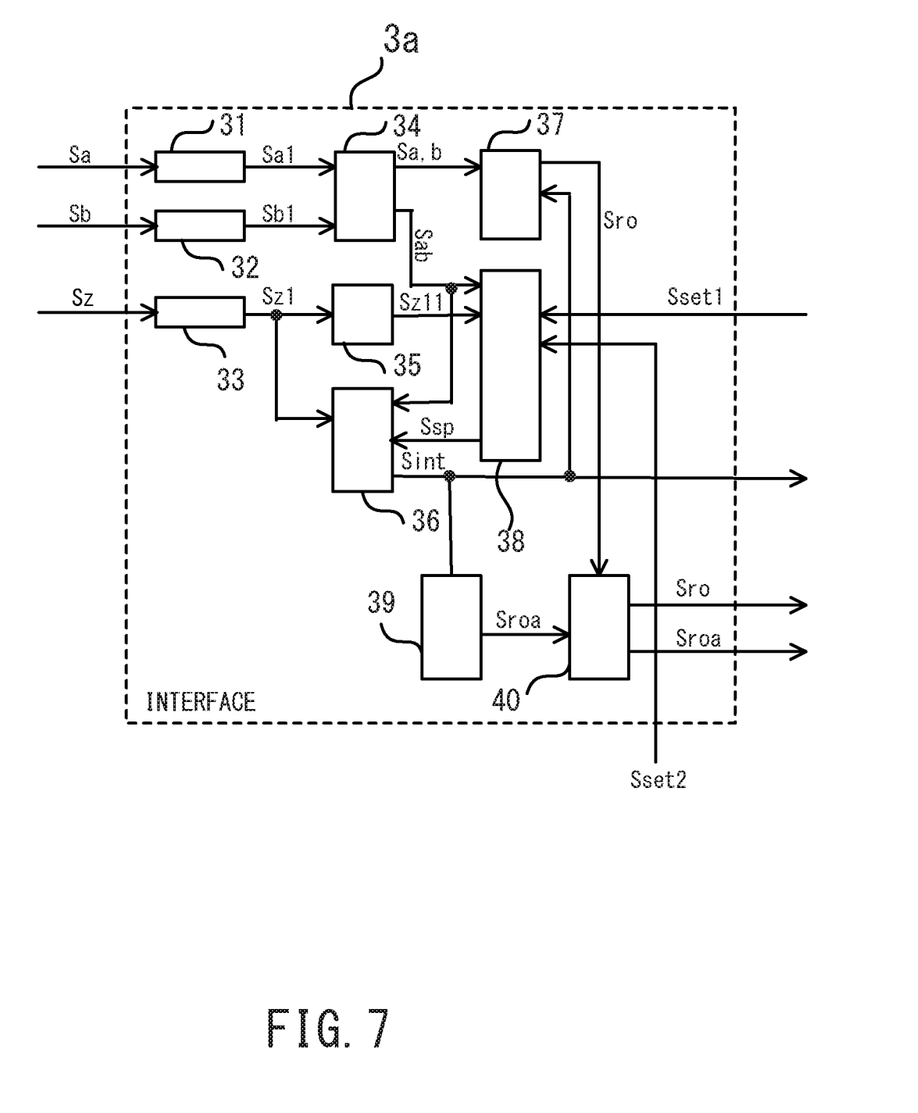
FIG. 7 is a diagram illustrating an internal configuration of an interface according to a second embodiment.

Referring to the drawings, descriptions will be provided for an encoder system according to a second embodiment. FIG. 7 is a diagram illustrating an internal configuration of an interface.

In the second embodiment, the interface is provided between the encoder and the processing circuitry. The interface generates the AB-phase signal from the A- and B-phase signals, and recognizes the information on the AB-phase signal at the timing when the Z-phase signal rises. The interface resets the information in the rotation angle counter at the starting point indicated by the beforehand stored AB-phase change pattern, and the rotation angle counter starts the new count. The interface increments the number of rotations of the motor at the starting point indicated by the AB-phase change pattern.

The same portions as those in the first embodiment will be hereinbelow denoted by the same reference signs, and descriptions for the portions will be omitted. Descriptions will be provided for only the portions which are different from those in the first embodiment.

As illustrated in FIG. 7, an interface 3a includes the digital filter 31, the digital filter 32, the digital filter 33, the AB waveform recognition circuitry 34, the Z waveform recognition circuitry 35, the starting point recognition circuitry 36, the rotation angle counter 37, the starting point storage device 38, a rotation number counter 39, and a buffer memory 40.

The rotation number counter 39 receives the interrupt signal Sint outputted from the starting point recognition circuitry 36. The rotation number counter 39 increments or decrements the number of rotations of the motor at a timing when the signal level of the interrupt signal Sint changes (from the low level to the high level, for example). The rotation number counter 39 outputs a readout signal Sroa representing rotation number information obtained by measuring the number of rotations of the motor to the buffer memory 40.

The buffer memory 40 receives and stores the readout signal Sro representing the rotation angle information obtained by measuring the rotation angle of the motor and outputted from the rotation angle counter 37, and the readout signal Sroa representing the rotation number information obtained by measuring the number of rotations of the motor and outputted from the rotation number counter 39. The buffer memory 40 outputs the stored rotation angle information and rotation number information on the motor to the processing circuitry and the outside.

Figure 8:
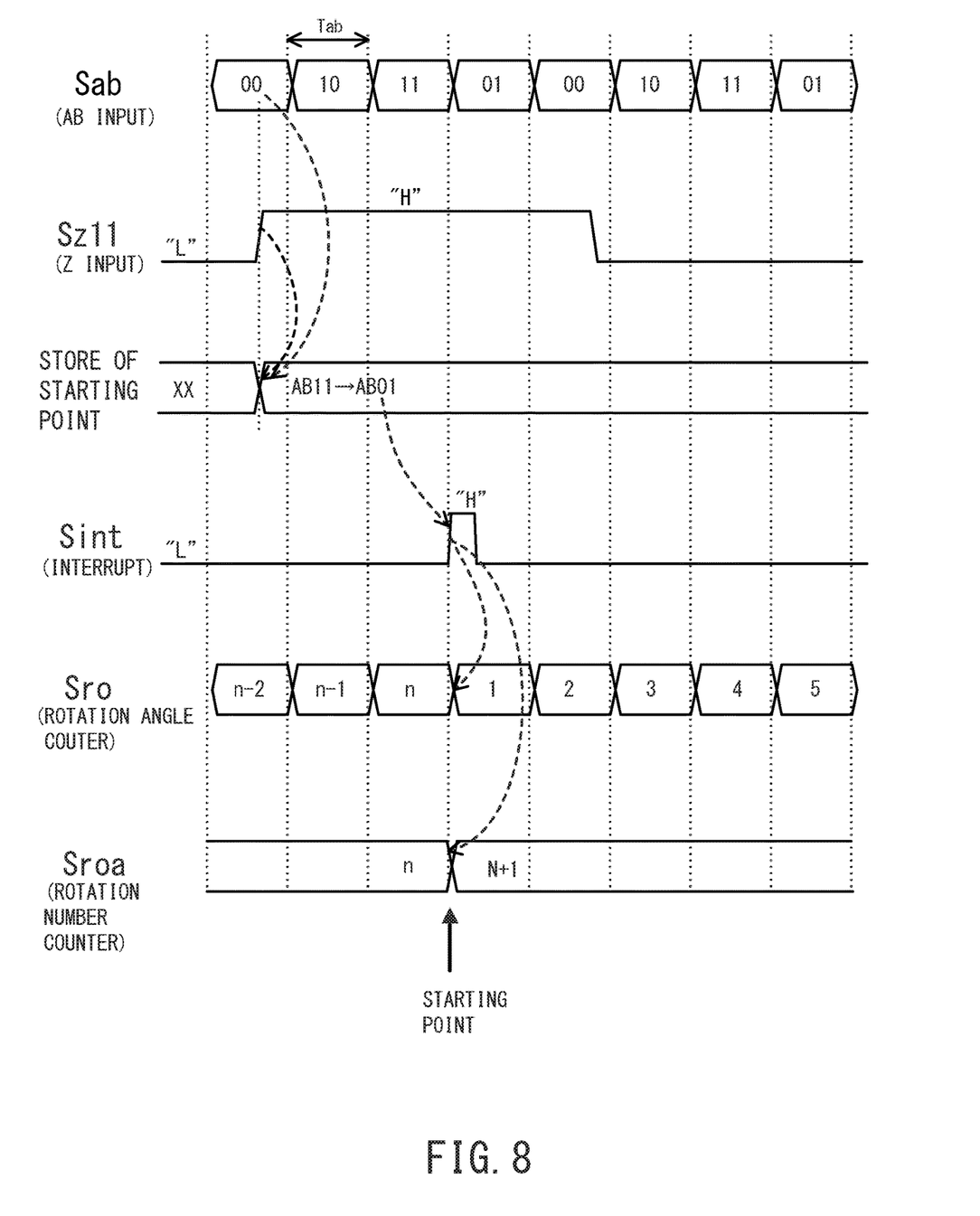
FIG. 8 is a timing chart illustrating how the interface according to the second embodiment works.

Next, referring to FIG. 8, descriptions will be provided for how the interface works. FIG. 8 is a timing chart illustrating how the interface works. The second embodiment omits descriptions for the same part of the work as that to be performed by the interface according to the first embodiment illustrated in FIG. 4, and explains only what makes the remaining part of the work different between the second embodiment and the first embodiment.

As illustrated in FIG. 8, the interrupt signal Sint changes from the low level to the high level after the interval from the storing of the starting point to the start of the interruption, for example after (Tab×2)+α (the change from AB11 to AB01). The rotation number counter 39 increments the number of rotations of the motor at a stating point indicated by the change in the signal level of the interrupt signal Sint (the change from the low level to the high level, for example). The rotation number counter 39 outputs the rotation number information on the motor to the buffer memory 40.

As discussed above, in the encoder system according to the second embodiment, the interface 3a includes the digital filter 31, the digital filter 32, the digital filter 33, the AB waveform recognition circuitry 34, the Z waveform recognition circuitry 35, the starting point recognition circuitry 36, the rotation angle counter 37, the starting point storage device 38, the rotation number counter 39, and the buffer memory 40. The timing at which the rotation angle counter 37 resets the count value is synchronized with the timing at which the number of rotations of the motor is incremented. In a case where the CPU 61 reads out the readout signals respectively from the rotation angle counter and the rotation number counter in two or more steps, the transmission of the readout signals via the buffer memory 40 makes sure that the content of the rotation angle counter and the content of the rotation number counter are synchronized with each other.

For these reasons, even in cases such as the noise in the transmission paths and the stop of the rotor around the starting point, the rotation angle and the number of rotations of the motor can be measured accurately.

Figure 9:
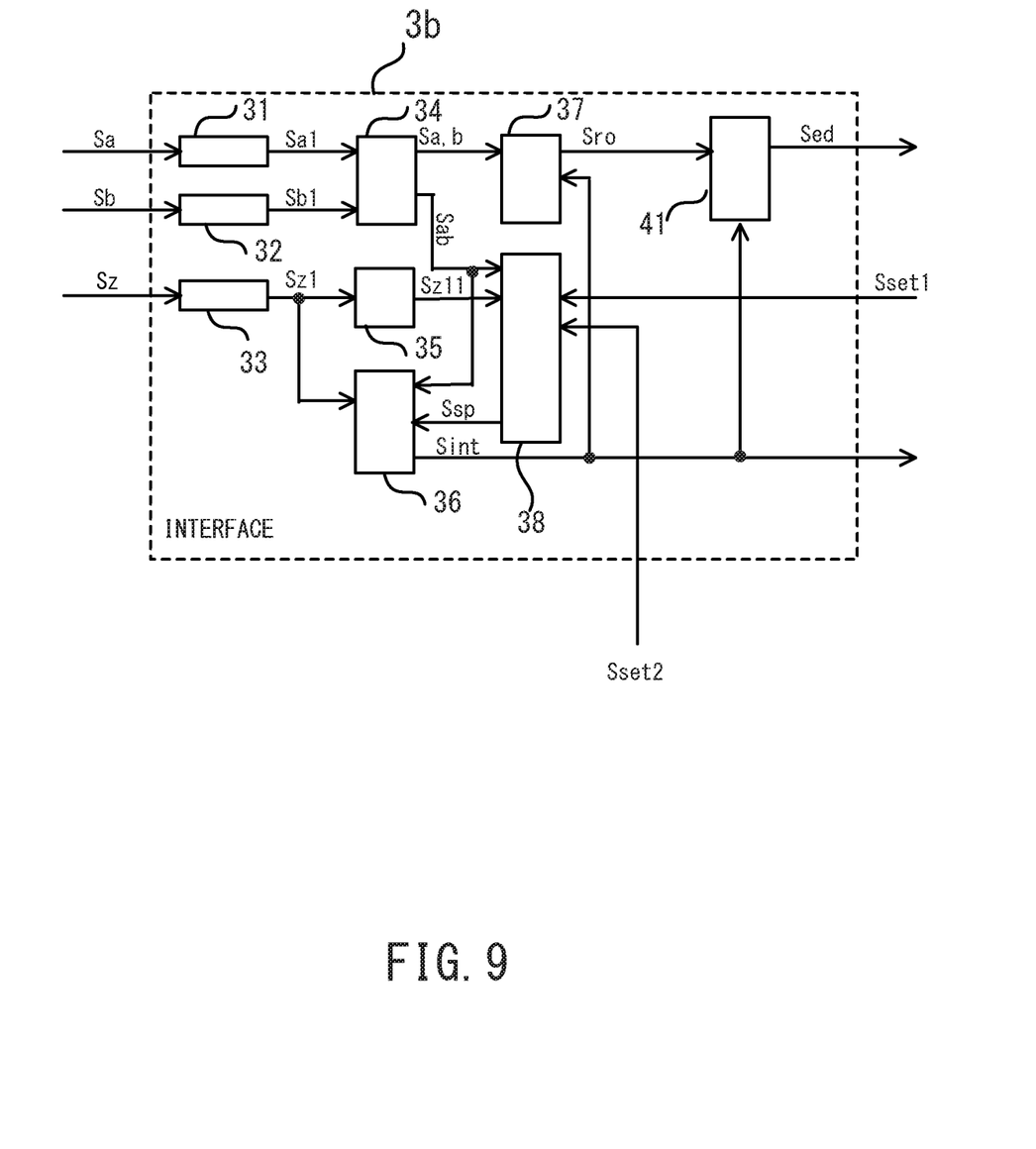
FIG. 9 is a diagram illustrating an internal configuration of an interface according to a third embodiment.

Referring to the drawing, descriptions will be provided for an encoder system according to a third embodiment. FIG. 9 is a diagram illustrating an internal configuration of an interface.

In the third embodiment, the interface is provided between the encoder and the processing circuitry. The interface generates the AB-phase signal from the A- and B-phase signals, and recognizes the information on the AB-phase signal at the starting point indicated by a rise in the Z-phase signal. The interface resets the information in the rotation angle counter at the starting point indicated by the beforehand stored AB-phase change pattern, and the rotation angle counter starts the new count. The interface increments the number of rotations of the motor at the starting point indicated by the AB-phase change pattern. An error detection circuitry determines whether the rotation angle information on the motor outputted from the rotation angle counter includes an error.

The same portions as those in the first embodiment will be hereinbelow denoted by the same reference signs, and descriptions for the portions will be omitted. Descriptions will be provided for only the portions which are different from those in the first embodiment.

As illustrated in FIG. 9, the interface 3b includes the digital filter 31, the digital filter 32, the digital filter 33, the AB waveform recognition circuitry 34, the Z waveform recognition circuitry 35, the starting point recognition circuitry 36, the rotation angle counter 37, the starting point storage device 38, and an error detection circuitry 41.

The error detection circuitry 41 receives the interrupt signal Sint outputted from the starting point recognition circuitry 36, and the readout signal Sro representing the rotation angle information on the motor which is outputted from the rotation angle counter 37. The error detection circuitry 41 outputs an error detection signal Sed to the processing circuitry and the outside in a case where an increase or decrease in the number of digits representing the value counted by the rotation angle counter beyond or from the maximum value of the count defined in the encoder 2 disagrees with the starting point indicated by the Z phase. In a case where the increase or decrease agrees with the starting point indicated by the Z phase, the error detection circuitry 41 outputs the readout signal Sro representing the rotation angle information on the motor to the processing circuitry.

As discussed above, in the encoder system according to the third embodiment, the interface 3b includes the digital filter 31, the digital filter 32, the digital filter 33, the AB waveform recognition circuitry 34, the Z waveform recognition circuitry 35, the starting point recognition circuitry 36, the rotation angle counter 37, the starting point storage device 38, and the error detection circuitry 41. The error detection circuitry 41 compares the increase or decrease in the number of digits representing the value counted by the rotation angle counter beyond or from the maximum value with the starting point indicated by the Z phase. In the case where the increase or decrease disagrees with the starting point indicated by the Z phase, the error detection circuitry 41 outputs the error detection signal Sed.

These make it possible to output only the correct rotation angle information on the motor obtained by the accurate measurement.

Figure 10:
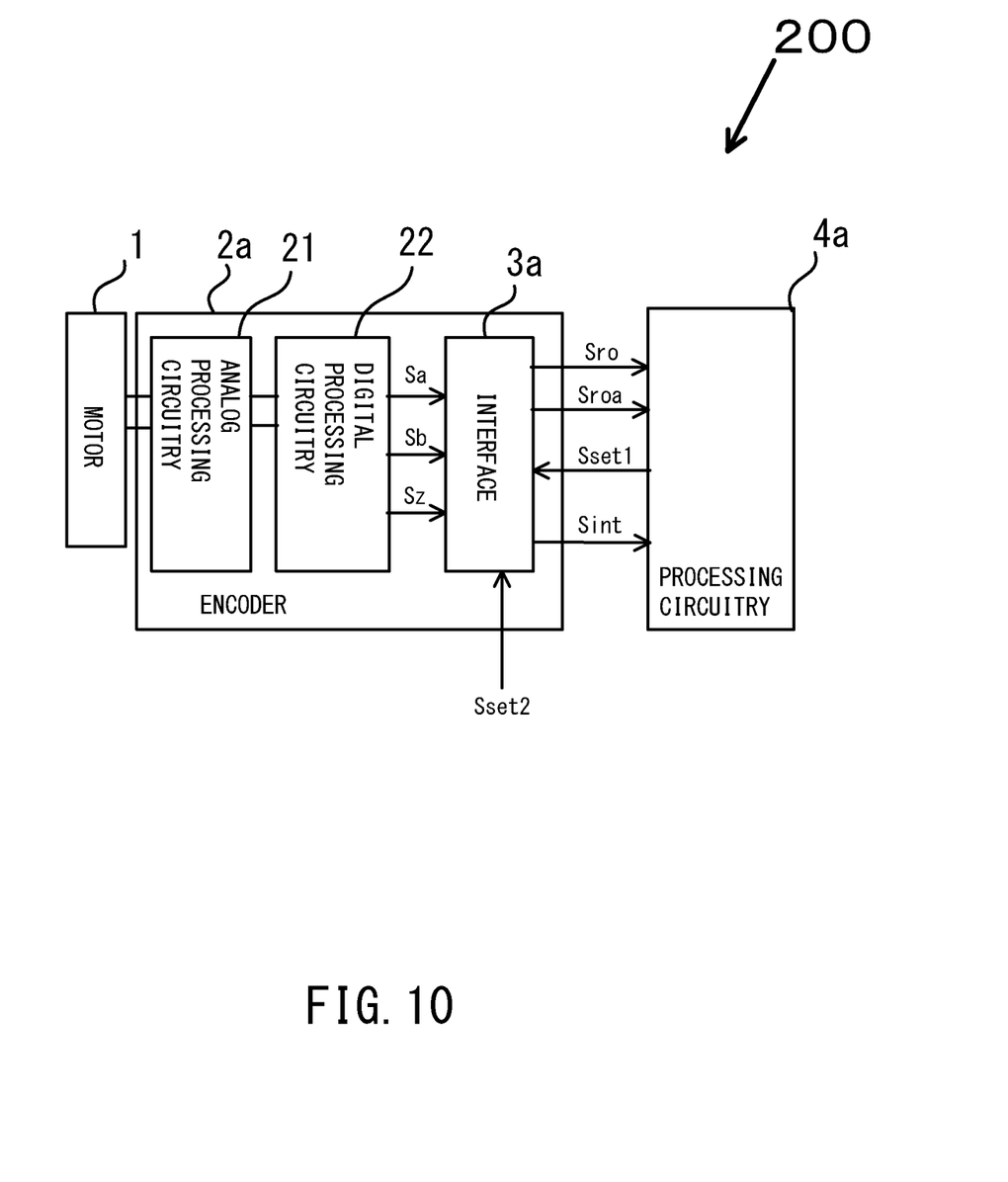
FIG. 10 is a diagram illustrating an encoder system according to a fourth embodiment.

Referring to the drawing, descriptions will be provided for an encoder system according to a fourth embodiment. FIG. 10 is a diagram illustrating the encoder system.

In the fourth embodiment, an encoder includes a built-in interface.

The same portions as those in the first embodiment will be hereinbelow denoted by the same reference signs, and descriptions for the portions will be omitted. Descriptions will be provided for only the portions which are different from those in the first embodiment.

As illustrated in FIG. 10, an encoder system 200 includes the motor 1, an encoder 2a, and a processing circuitry 4a.

The encoder 2a includes an analog processing circuitry (sensor) 21, a digital processing circuitry 22, and the interface 3a. The encoder 2a is also referred to as a "rotary encoder." A microcontroller, an MPU or the like is used as the processing circuitry 4a.

The analog processing circuitry (sensor) 21 detects the position and speed of the motor 1. The digital processing circuitry 22 receives information (analog information) on the position and speed of the motor 1 which are detected by the analog processing circuitry (sensor) 21, and converts the analog information into digital information, thus outputting the A-, B- and Z-phase signals Sa, Sb, Sz representing the digital information to the interface 3a.

The interface 3a receives the set signal Sset1 outputted from the processing circuitry 4a, and the set signal Sset2 outputted from the outside. The interface 3a outputs the readout signal Sro representing the rotation angle information on the motor and the readout signal Sroa representing the rotation number information on the motor to the processing circuitry 4a.

The interface 3a has the same internal configuration as the interface 3a according to the second embodiment, and detailed descriptions for the interface 3a will be omitted.

As discussed above, in the encoder system 200 according to the fourth embodiment, the encoder 2a includes the interface 3a.

This makes it possible to shorten the length of the transmission lines and the signal lines, and thereby to reduce the noise generated in the transmission lines and the signal lines. The accurate rotation angle information and rotation number information on the motor 1 can be transmitted from the encoder 2a to the processing circuitry 4a.

Figure 11:
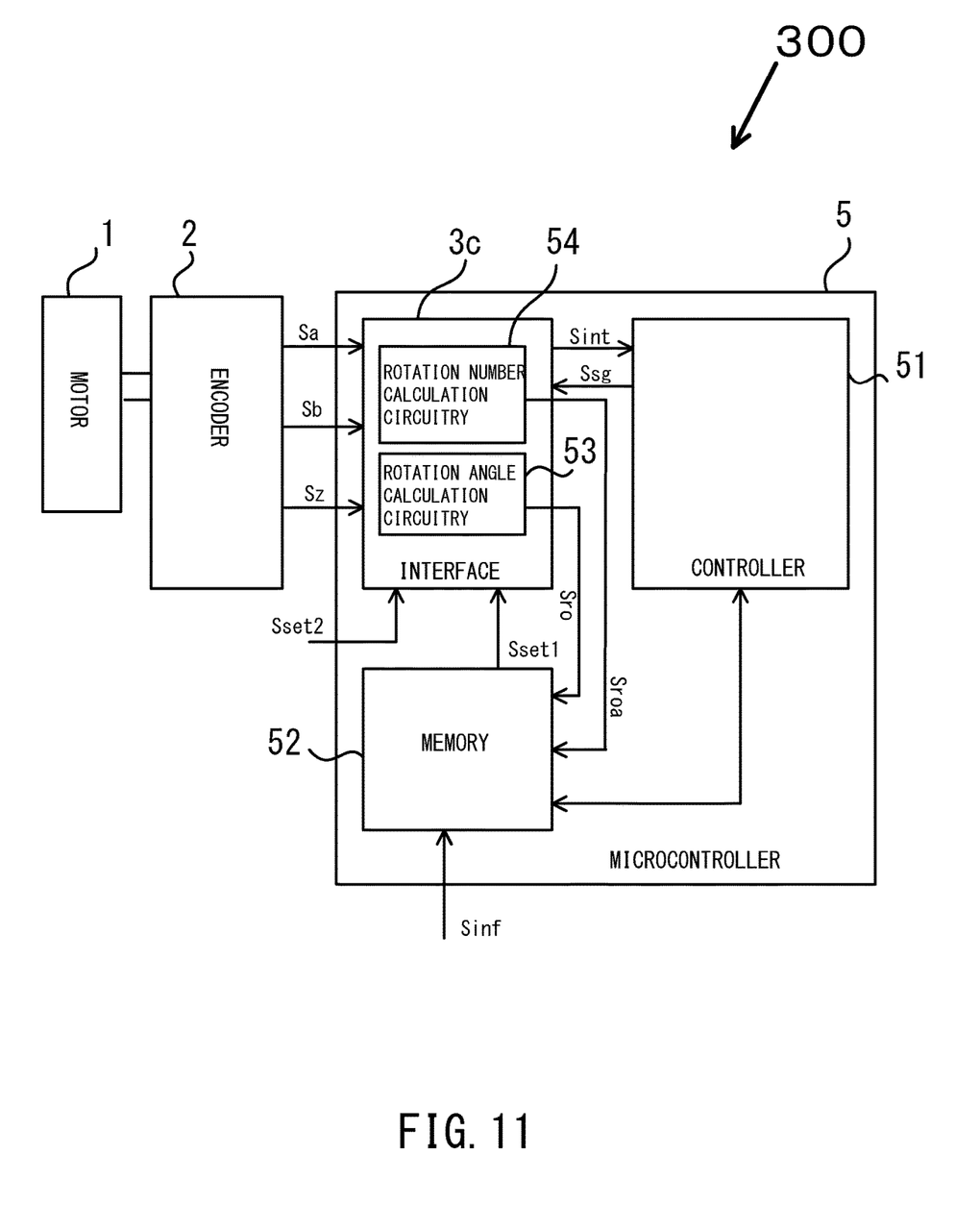
FIG. 11 is a diagram illustrating an encoder system according to a fifth embodiment.

Referring to the drawing, descriptions will be provided for an encoder system according to a fifth embodiment. FIG. 11 is a diagram illustrating the encoder system.

In the fifth embodiment, a microcontroller includes a built-in interface.

The same portions as those in the first embodiment will be hereinbelow denoted by the same reference signs, and descriptions for the portions will be omitted. Descriptions will be provided for only the portions which are different from those in the first embodiment.

As illustrated in FIG. 11, an encoder system 300 includes the motor 1, the encoder 2, and a microcontroller 5.

The microcontroller 5 includes an interface 3c, a controller 51, and a memory 52.

The interface 3c receives the A-, B- and Z-phase signals Sa, Sb, Sz outputted from the encoder 2, the set signal Sset1 stored in the memory 52, the set signal Sset2 from the outside, and a control signal Ssg from the controller 51. The interface 3c outputs the interrupt signal Sint to the controller 51. The interface 3c includes a rotation angle calculation circuitry 53, and a rotation number calculation circuitry 54.

The memory 52 receives and stores an information signal Sinf representing software and programs needed for a rotation angle calculation processing and a rotation number calculation processing to be performed by the interface 3c. A nonvolatile semiconductor memory, a volatile semiconductor memory, or the like is used as the memory 52.

The controller 51 integrally controls the inside of the microcontroller 5. A processor or a CPU is used as the controller 51. The controller 51 receives the interrupt signal Sint outputted from the interface 3c. The controller 51 controls the write into, readout from, transfer to and from, as well as copying to and from the memory 52.

While the interface 3c is performing the rotation angle calculation processing and the rotation number calculation processing, the controller 51 performs hardware control on the rotation angle calculation circuitry 53 and the rotation number calculation circuitry 54. The hardware control includes integrated control to be applied to a portion including the rotation angle calculation circuitry 53 and the rotation number calculation circuitry 54.

While the interface 3c is performing the rotation angle calculation process and the rotation number calculation process, the controller 51 reads out the software and programs stored in the memory 52, and performs software control on the rotation angle calculation circuitry 53 and the rotation number calculation circuitry 54 using the software and programs.

Based on the hardware control and software control performed by the controller 51, the rotation angle calculation circuitry 53 generates the readout signal Sro representing the rotation angle information on the measured rotation angle of the motor from the AB- and Z-phase signals Sab, Sz, the AB phase change pattern, as well as the interrupt signals Sint. The rotation angle calculation circuitry 53 outputs the readout signal Sro to the memory 52. The memory 52 stores the readout signal Sro.

Based on the hardware control and software control performed by the controller 51, the rotation number calculation circuitry 54 generates the readout signal Sroa representing the rotation number information on the measured rotation number of the motor from the AB- and Z-phase signals Sab, Sz, the AB-phase change pattern, as well as the interrupt signals Sint. The rotation number calculation circuitry 54 outputs the readout signal Sroa to the memory 52. The memory 52 stores the readout signal Sroa.

The use of the software control to be performed by the controller 51 makes it possible to make the circuit size of the interface 3c much smaller than the circuit size of the interface 3a in the second embodiment and the circuit size of the interface 3 in the first embodiment. This makes it possible to reduce the counters, the registers and the like to a large extent, for example.

As discussed above, in the encoder system 300 according to the fifth embodiment, the microcontroller 5 includes the interface 3c, the controller 51, and the memory 52. The interface 3c includes the rotation angle calculation circuitry 53 and the rotation number calculation circuitry 54. While the interface 3c is performing the rotation angle calculation process and the rotation number calculation process, the controller 51 performs the hardware control and the software control on the rotation angle calculation circuitry 53 and the rotation number calculation circuitry 54. The software control reads out and uses the software and programs stored in the memory 52.

These make it possible to accurately measure the rotation angle and the number of rotations of the motor, and to reduce the circuit size of the interface 3c to a large extent.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encoder system comprising:
an encoder configured to detect a position and a speed of a motor, and generate A-, B- and Z-phase signals; and
an interface including
an AB waveform recognition circuitry configured to recognize a waveform of an AB phase from the A- and B-phase signals,
a Z waveform recognition circuitry configured to recognize a period of an enable state of a Z phase from the Z-phase signal, a starting point storage device configured to store a value of the AB phase when the Z phase changes from a disable state to the enable state and store an AB-phase change pattern, a starting point recognition circuitry configured to generate and output an interrupt signal which changes from the disable state to the enable state after the AB-phase change pattern goes through following the change of the Z phase from the disable state to the enable state, and a rotation angle counter configured to reset a count of a rotation angle of the motor, and start a new count of the rotation angle of the motor at a timing when the interrupt signal changes from the disable state to the enable state.

2. The encoder system according to claim 1, further comprising a processing circuitry configured to measure the number of rotations of the motor by incrementing the number of rotations of the motor at the timing when the interrupt signal changes from the disable state to the enable state.

3. The encoder system according to claim 2, wherein a microcontroller or a micro processing unit (MPU) is used as the processing circuitry.

4. The encoder system according to claim 2, wherein the processing circuitry is provided with a central processing unit (CPU), and the CPU measures the number of rotations of the motor by incrementing the number of rotations of the motor.

5. The encoder system according to claim 1, wherein the interface further includes a rotation number counter, and the rotation number counter measures the number of rotations of the motor by incrementing or decrementing the number of rotations at the timing when the interrupt signal changes from the disable state to the enable state.

6. The encoder system according to claim 5, wherein the interface further includes a buffer memory, and the buffer memory stores rotation angle information on the motor outputted from the rotation angle counter, and rotation number information on the motor outputted from the rotation number counter.

7. The encoder system according to claim 1, wherein the interface further includes an error detection circuitry, and the error detection circuitry outputs an error detection signal in a case where count information defined in the encoder disagrees with a starting point indicated by the Z phase.

8. The encoder system according to claim 1, wherein a minimum value, a typical value and a maximum value of a pulse width of the Z-phase signal are respectively set at Tab×2, Tab×4 and Tab×6, where Tab is a phase difference between the A-phase signal and the B-phase signal.

9. The encoder system according to claim 1, wherein the motor is applied to a home appliance or an industrial apparatus.

10. An encoder system comprising:
a motor; and
an encoder arranged adjacent to the motor, and including an analog processing circuitry, a digital processing circuitry and an interface, wherein the analog processing circuitry detects a position and a speed of the motor, the digital processing circuitry generates digital A-, B- and Z-phase signals from position information and speed information on the motor detected by the analog processing circuitry, and the interface includes
an AB waveform recognition circuitry configured to recognize a waveform of an AB phase from the A- and B-phase signals, a Z waveform recognition circuitry configured to recognize a period of an enable state of a Z phase from the Z-phase signal, a starting point storage device configured to store a value of the AB phase when the Z phase changes from a disable state to the enable state and store an AB-phase change pattern, a starting point recognition circuitry configured to generate and output an interrupt signal which changes from the disable state to the enable state after the AB-phase change pattern goes through following the change in the Z phase from the disable state to the enable state, a rotation angle counter configured to reset a count of a rotation angle of the motor, and start a new count of the rotation angle of the motor at a starting point indicated by a change in the interrupt signal from a low level to a high level, and a rotation number counter configured to increment the number of rotations at the starting point indicated by a change in the interrupt signal from a low level to a high level.

11. The encoder system according to claim 10, further comprising a processing circuitry configured to receive the interrupt signal, rotation angle information on the motor measured by the rotation angle counter, and rotation number information on the motor measured by the rotation number counter.

12. The encoder system according to claim 11, wherein a microcontroller or a micro processing unit (MPU) is used as the processing circuitry.

13. The encoder system according to claim 11, wherein the processing circuitry is provided with a central processing unit (CPU), and the CPU measures the number of rotations of the motor by incrementing the number of rotations.

14. The encoder system according to claim 10, wherein the interface further includes a buffer memory; and the buffer memory stores rotation angle information on the motor outputted from the rotation angle counter, and rotation number information on the motor outputted from the rotation number counter.

15. The encoder system according to claim 10, wherein a minimum value, a typical value and a maximum value of a pulse width of the Z-phase signal are respectively set at Tab×2, Tab×4 and Tab×6, where Tab is a phase difference between the A-phase signal and the B-phase signal.

16. An encoder system comprising:
an encoder; and
a microcontroller including an interface, a controller, and a memory, wherein the interface receives A-, B- and Z-phase signals outputted from the encoder, and includes a rotation angle calculation circuitry and a rotation number calculation circuitry, the memory stores programs and software to be used for a rotation angle calculation processing and a rotation number calculation processing, during the rotation angle calculation processing and the rotation number calculation processing, the controller performs hardware control on a portion including the rotation angle calculation circuitry and the rotation number calculation circuitry, and concurrently performs software control on the rotation angle calculation circuitry and the rotation number calculation circuitry by reading out and using the software and programs stored in the memory, based on the hardware control and the software control performed by the controller, the rotation angle calculation circuitry measures a rotation angle of a motor using an AB-phase signal, the Z-phase signal, an AB-phase change pattern and an interrupt signal, and based on the hardware control and the software control performed by the controller, the rotation number calculation circuitry measures the number of rotations of the motor using the AB-phase signal, the Z-phase signal, the AB-phase change pattern and the interrupt signal.

17. The encoder system according to claim 16, wherein a nonvolatile semiconductor memory or a volatile semiconductor memory is used as the memory.

* * * * *